(No Model.)

O. ANDERSON.
CENTRIFUGAL CREAMER.

No. 576,357. Patented Feb. 2, 1897.

WITNESSES:
Robert Sollberger
Beatrice Charles

INVENTOR:
Oscar Anderson,
BY Drake & Co. ATTY'S.

UNITED STATES PATENT OFFICE.

OSCAR ANDERSON, OF NEWARK, NEW JERSEY.

CENTRIFUGAL CREAMER.

SPECIFICATION forming part of Letters Patent No. 576,357, dated February 2, 1897.

Application filed April 18, 1895. Serial No. 546,173. (No model.)

*To all whom it may concern:*

Be it known that I, OSCAR ANDERSON, a citizen of the United States, residing at Newark, in the county of Essex and State of New Jersey, have invented certain new and useful Improvements in Centrifugal Creamers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to secure an increased output of cream from a given amount of milk within a given limit of time, to provide a simple structure capable of being quickly and easily cleaned, to enable the diameter of the bowl to be diminished without reducing its separating or cream-extracting capacity, so that said bowl may be run with greater safety at a higher rate of speed and require less power for running, and to secure other advantages and results, some of which may be referred to in connection with the description of the working parts.

The invention consists in the improved centrifugal creamer and in the arrangements and combinations of parts, all substantially as will be hereinafter set forth, and finally embraced in the clauses of the claim.

Figure 1:
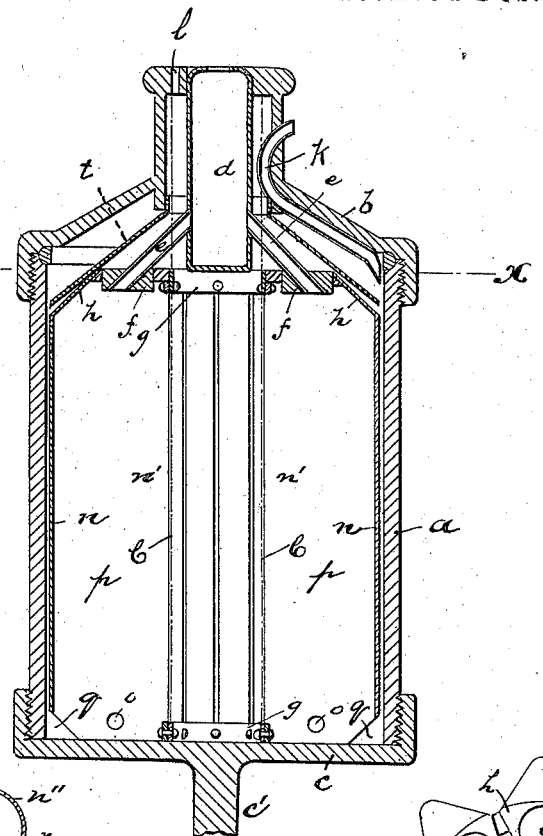
Figure 3:
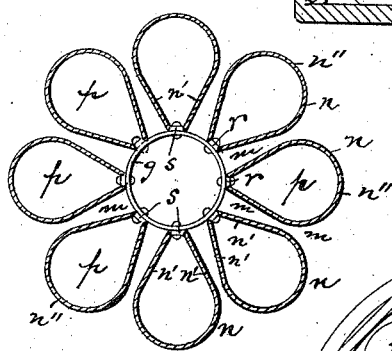
Figure 4:
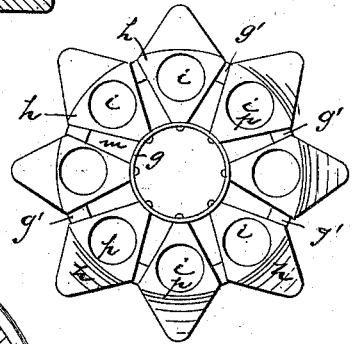
Figure 2:
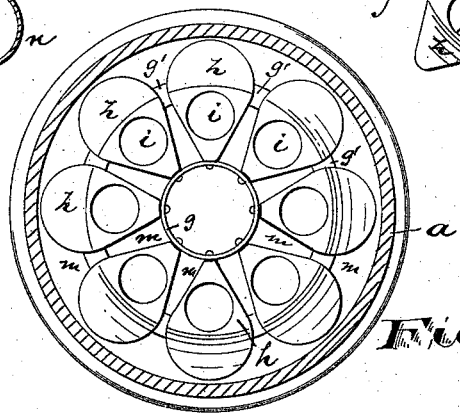

Referring to the accompanying drawings, in which like letters indicate corresponding parts in each of the figures, Figure 1 is a central vertical section of a centrifugal creaming-bowl, showing my improvements. Fig. 2 is a horizontal section taken at line $x$. Fig. 3 is a horizontal sectional detail showing more clearly the form of certain partitions, and Fig. 4 is a top plan showing the means for holding said partitions together.

In said drawings, $a$ indicates the centrifugal bowl, having the cover $b$ and base portion $c$, to which the rotary shaft $c'$ is attached in any suitable manner to convey the necessary rotary motion to said bowl. Within said bowl is arranged a collection or group of partitions $n$, on which the cream gathers as the milk in its passage through the bowl comes in contact with said partitions. Said partitions are of peculiar shape and arrangement and are joined together, preferably, in a single frame, and are thus together removable from the bowl to admit of an easy and convenient cleansing. At the center of the cover is arranged a feed-receptacle $d$, open at the top to receive the milk or fluid to be separated and at the lower end provided with a series of divergent tubes or ducts $e\ e$, which are turned or inclined downward to enter the several chambers $p$, formed by the partitions $n$. At their lower ends said tubes or ducts $e\ e$ are provided with blocks $f\ f\ f$, which serve as plugs or covers for closing the upper ends of the chambers inclosed by said partitions, so that no liquid but that supplied by the ducts $e\ e\ e$ may enter said chambers. Said partitions $n$ are preferably formed of sheet metal, bent as shown in Fig. 3, the side parts $n'\ n'$ extending inward and converging, so as to closely approach one another. The larger parts of the chambers or spaces within the bent partitions lie toward the periphery of the bowl, where the centrifugal force is the greatest.

The partitions approach in construction more or less closely that of a tube. Indeed in some cases tubes of ordinary shape may be employed with good effect after being cut or perforated at the inner sides or toward the cream-wall of the bowl, (represented by the broken lines C.)

The bent partitions $n$ are generally made oval or oblong in plan, so as to extend from points closely near to the inside walls of the bowl to points near the center, where the cream-wall $l$ is formed when the machine is in operation to deliver the cream to said cream-wall without occupying much space circumferentially. The said bent partitions may be joined or attached at their upper and lower ends by rings $g\ g$ and be united by solder, rivets, or any other means suited for the purpose and capable of withstanding the centrifugal force brought to bear thereon. Said bent partitions are held apart from one another by blocks or stay-pieces $g'$, so that there will be an open communication between from the peripheral parts of the outer blue-milk chamber $m$ direct to the cream-wall without interference with the new-milk chambers. The partitions $n$ and blocks $g'$ are held together by rivets $o$, Fig. 1, which pass through said blocks and partitions and are headed at the insides of the partitions. The parts may be soldered together either in connection with or independent of the rivets. At the upper ends said partitions receive a top piece or a series of top pieces $h$, which are provided with suitable openings $i$ to receive the new milk. In said openings are plugs $f$, before referred to, which form impermeable joints with the top pieces. At their lower ends said partitions are open, as at $q$, near the side walls of the bowl to allow an outflow of fluid into the common outer chamber $m$. On entering said chamber said fluid is immediately brought into close contiguity with the outer side faces of the partitions which serve to attract or gather the cream particles in the milk and lead them inward toward the bowl center.

The chambers $p$, formed within the partitions $n$, preferably have a continuous open communication with the cream-wall from one ring to the other, the vertical edges of the sides or portions $n'$ being held apart at the top and bottom by small lugs $r$, fastened to the rings.

The sides or portions $n'$ of the partitions are preferably inclined to and cut the radii of the bowl center, so that the cream globules or particles in their inward courses come in contact with the inner walls of the partitions $n$ and flow inward over said walls to the cream-wall location direct.

The broad rounded parts $n''$ of the partitions $n$ lying near the periphery of the bowl present a large amount of cream-gathering surface to the blue milk, where the centrifugal force is the greatest. The small cream globules or particles remaining in the blue milk and which are hard to separate are here brought into contact with said surfaces and are caused to coalesce thereon. Parts of said backs $n''$ lie on opposite sides of the central radial lines of the chambers $p$, formed by said partitions, and are inclined so as to cross the radii on each side of each center radius obliquely. The obliquity of these back surfaces not only serves in facilitating the gathering and coalescing of the cream particles at points where the milk is blue or free of large cream particles, but also facilitates the inward flow of cream toward the center of the bowl, leading it to the outer sides of the portions $n'$, over which it continues its course to or nearly to the cream-wall. The backs $n''$ are imperforate and are thus not open to allow a transmission of fluid in the body of one chamber passing outward or inward to the next, but said fluid is compelled to move to the end of the partition before passing from the inner into the outer chamber. Both sides of the partitions by the construction described serve to conduct the cream to the cream-wall.

The new milk while being deprived of its cream flows lengthwise of the bowl through each of the chambers $p$, the bulk of the milk flowing near the periphery, where the centrifugal force is the greatest. As it flows downward the fluid loses its lighter particles, the cream flowing toward the cream-wall near the center of the bowl and its separation and flow being facilitated by the inwardly-extending sides of the partitions. At the bottoms of the chambers $p$ the milk, devoid of the greater part of the cream, flows outward toward the periphery into the chamber $m$ and takes a return course through said chamber $m$ toward the blue-milk outlet, the blue milk continuing to lose its cream particles even when the flow is rapid because of the broad creaming or skimming surfaces at the backs of the partitions with which the fluid is brought in contact in its return flow. Inasmuch as the partitions extend out close to the interior walls of the bowl and the outer parts of both of the chambers $p$ and $m$ lie near the periphery of the bowl the full centrifugal force is exerted on both the new milk and blue milk in their downward and return courses, and thus the efficiency of the machine is increased, as will be apparent.

Above the collection of partitions I prefer to arrange a funnel-shaped partition $t$, which extends from points quite close to the inside walls of the bowl upward and inward to points just outside the cream-wall, so that only blue milk, devoid or practically devoid of cream, can pass said funnel-shaped partition at its outer edge and cream at its inner edge, the former flowing upward and outward through the blue-milk eduction-tube $k$ and the latter through cream-outlet duct $l$.

I am aware that various changes may be made in the construction of the bowl without departing from the invention, and I do not wish to be understood as limiting myself by the positive descriptive terms employed in the body of the specification excepting as the state of the art may require.

Having thus described the invention, what I claim as new is—

1. In combination with the rotary bowl, an annular series of vertically-disposed, separate partitions, each forming a chamber and adapted to carry new milk through the bowl at right angles to the direction of centrifugal force, the chambers being open to allow an outflow of cream from the new milk passing therethrough to the cream-wall and to allow an outflow of blue milk at the end opposite that receiving said new milk to the chamber, $m$, in which said partitions are stationed, a milk-reservoir, $d$, having ducts leading to the chamber of each partition and a partition, $t$, at one end of the group of partitions, open at the center and near the inner wall of the bowl to allow a passage for cream and blue milk, the said parts being disposed to occasion a flow of new milk through the chamber of each of the said partitions and an out-passage of cream therefrom during such flow and also an out-passage of blue milk from the chamber of each partition into a common blue-milk chamber and a movement of said blue milk in a direction opposite that taken by the new milk, and finally an imposition of cream from said blue milk upon the outer walls of said partitions during the return passage of the blue milk toward the outlet-duct, and suitable eduction passages or ducts for blue milk and cream at the end of the group of partitions at which said new-milk reservoir is stationed, substantially as set forth.

2. The combination with the rotary bowl, of a series of partitions forming chambers *p*, and having open tops, plugs or covers for closing said tops, a milk receptacle or reservoir, ducts leading therefrom to and through said plugs and separable from said bowl and partitions with said reservoir and plugs, and ducts for the cream and blue milk, substantially as set forth.

3. In a centrifugal creamer, the combination with a rotary bowl having suitable inlet and outlet ducts, of partitions arranged in a series around the axial center of the bowl, said partitions being each bent to form an independent chamber capable of admitting an opposite flow of new milk apart from the outside blue milk of the bowl, said chamber opening toward the center of the bowl to allow a flow of cream to the cream-wall and opening at one end to the chamber, *m*, to allow an outflow of milk from which the cream has been partially separated into said chamber *m*, the new-milk-inlet ducts to the chambers within the partitions and the outflow-passages from the chamber, *m*, being at the same end of the bowl to occasion the opposite flows, substantially as set forth.

In testimony that I claim the foregoing I have hereunto set my hand this 12th day of April, 1895.

OSCAR ANDERSON.

Witnesses:
CHARLES H. PELL,
BEATRICE CHARLES.